US009434213B2

(12) United States Patent
Matsuda

(10) Patent No.: US 9,434,213 B2
(45) Date of Patent: Sep. 6, 2016

(54) PNEUMATIC TIRE WITH TREAD HAVING CENTER SIPES AND MIDDLE SIPES

(71) Applicant: SUMITOMO RUBBER INDUSTRIES, LTD., Kobe-shi, Hyogo (JP)

(72) Inventor: Yosuke Matsuda, Kobe (JP)

(73) Assignee: SUMITOMO RUBBER INDUSTRIES, LTD., Kobe-Shi (JP)

( * ) Notice: Subject to any disclaimer, the term of this patent is extended or adjusted under 35 U.S.C. 154(b) by 344 days.

(21) Appl. No.: 14/039,240

(22) Filed: Sep. 27, 2013

(65) Prior Publication Data

US 2014/0230979 A1  Aug. 21, 2014

(30) Foreign Application Priority Data

Feb. 15, 2013 (JP) .................................. 2013-028098
Jun. 3, 2013 (JP) .................................. 2013-117158

(51) Int. Cl.
*B60C 11/12* (2006.01)
*B60C 11/03* (2006.01)

(52) U.S. Cl.
CPC ............ *B60C 11/12* (2013.01); *B60C 11/0304* (2013.04); *B60C 11/0306* (2013.04); *B60C 2011/0346* (2013.04); *B60C 2011/0348* (2013.04); *B60C 2011/0353* (2013.04); *B60C 2011/0355* (2013.04); *B60C 2011/0381* (2013.04); *B60C 2011/0383* (2013.04); *B60C 2011/0388* (2013.04); *B60C 2011/129* (2013.04); *B60C 2011/1209* (2013.04); *B60C 2011/1213* (2013.04)

(58) Field of Classification Search
CPC ............... B60C 11/12; B60C 11/0306; B60C 2011/0388; B60C 2011/0383; B60C 2011/129; B60C 2011/0346; B60C 2011/0381
See application file for complete search history.

(56) References Cited

U.S. PATENT DOCUMENTS

| 4,574,856 | A * | 3/1986 | Graas ................. B60C 11/0306 152/209.18 |
| 6,250,354 | B1 * | 6/2001 | Kawai ................ B60C 11/0306 152/209.18 |
| 2003/0102064 | A1 * | 6/2003 | Below ................ B60C 11/0309 152/209.18 |

FOREIGN PATENT DOCUMENTS

CN     102398478 A  *  4/2012
JP     08-216623 A  *  8/1996
(Continued)

OTHER PUBLICATIONS

Machine translation for Japan 2006-176055 (no date).*
Machine translation for Japan 2006-103522 (no date).*
Machine translation for Japan 08-216623 (no date).*
(Continued)

*Primary Examiner* — Steven D Maki
(74) *Attorney, Agent, or Firm* — Birch, Stewart, Kolasch & Birch, LLP

(57) ABSTRACT

A pneumatic tire includes a tread portion provided with a pair of center main grooves to define a center portion therebetween, a pair of shoulder main grooves arranged axially outside the center main grooves to define a middle portion between the center and shoulder main grooves, and middle lateral grooves to divide the middle portion into middle blocks. Each center main groove extends in a zigzag manner including inclined long sides and inclined short sides alternately arranged in a circumferential direction of the tire. The center portion is provided with at least six center sipes within a circumferential region corresponding to a pitch of middle lateral grooves. Each middle block has a circumferential length of 85% to 95% the pitch, and is provided with at least one middle sipe. The number of middle sipe on each middle block is five or less.

9 Claims, 4 Drawing Sheets

(56) References Cited

FOREIGN PATENT DOCUMENTS

| JP | 2006-103522 A | * | 4/2006 |
| JP | 2006-176035 A | * | 7/2006 |
| JP | 2010-274695 A | | 12/2010 |

OTHER PUBLICATIONS

Machine translation for China 102398478 (no date).*
Extended European Search Report dated Aug. 5, 2014 for Application No. 13183856.7.

* cited by examiner

PNEUMATIC TIRE WITH TREAD HAVING CENTER SIPES AND MIDDLE SIPES

BACKGROUND OF THE INVENTION

1. Field of the Invention

The present invention relates to a pneumatic tire having an improved icy road performance while maintaining steering stability on dry roads.

2. Description of the Related Art

Recent years, in order to improve icy road performance of tires, Japanese unexamined Patent Application Publication No. 2010-274695 discloses a pneumatic tire having a tread block provided with a plurality of sipes that divide it into a plurality of block-pieces with edges for scratching an icy road surface. Typically, adjacent block-pieces divided by the sipe are usually easy to deform or slide each other through the sipe surfaces when the tire is subjected to friction force on the road, such that each edge of the block-pieces provides high friction force by scratching the icy road surface.

However, the large deformation of block-pieces causes loss of ground contact area of the tread block, whereby steering stability of the tire on dry roads tends to deteriorate.

SUMMARY OF THE INVENTION

The present invention has been worked out in light of the circumstances described above, and has a main object of providing a pneumatic tire having an improved traveling performance on icy roads while maintaining steering stability on dry roads.

According to one aspect of the present invention, there is provided a pneumatic tire including a tread portion provided with a pair of circumferentially and continuously extending center main grooves on both sides of a tire equator to define a center portion therebetween, a pair of circumferentially and continuously extending shoulder main grooves arranged axially outside the center main grooves to define a middle portion between the center main groove and the shoulder main groove on each side of the tire equator, and a plurality of middle lateral grooves to divide the middle portion into a middle block row including a plurality of middle blocks. Each center main groove extends in a zigzag manner including a plurality of inclined long sides and a plurality of inclined short sides, which are alternately arranged in a circumferential direction of the tire. The center portion is provided with at least six axially extending center sipes within a circumferential region corresponding to a pitch of circumferentially adjacent middle lateral grooves. Each middle block has a circumferential length in a range of from 85% to 95% with respect to the pitch, and is provided with at least one axially extending middle sipe. The number of middle sipe on each middle block is five or less.

DESCRIPTION OF THE EMBODIMENTS

An embodiment of the present invention will be explained below with reference to the accompanying drawings.

Figure 1:
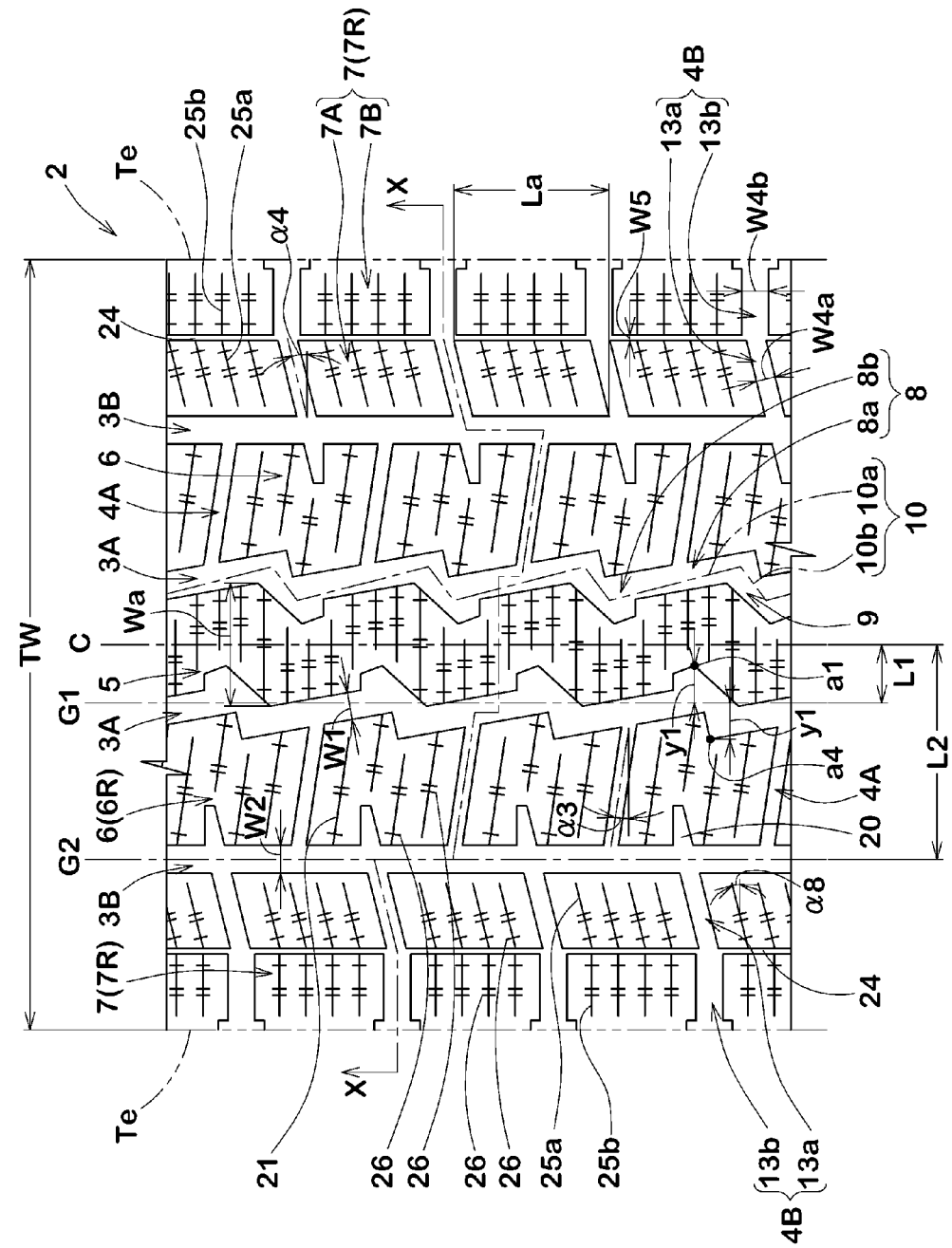
FIG. 1 is a development view of a tread portion of a pneumatic tire according to an embodiment of the present invention.

Referring to FIG. 1, a pneumatic tire (hereinafter it may simply be referred as "the tire") in accordance with the present invention may be preferably embodied as a studless tire. The tire 1 comprises a tread portion 2 provided with a pair of circumferentially and continuously extending center main grooves 3A, 3A on both sides of the tire equator C, a pair of circumferentially and continuously extending shoulder main grooves 3B, 3B arranged axially outside the center main grooves 3A, a plurality of middle lateral grooves 4A connecting between the center main groove 3A and the shoulder main groove 3B, and a plurality of shoulder lateral grooves 4B connecting between the shoulder main groove 4B and the tread edge Te.

Thus, the tread portion 2 is separated as a plurality of land portions that include a center portion 5 defined between the center main grooves 3A, 3A, a pair of middle block rows 6R each of which includes a plurality of middle blocks 6 divided among the center main groove 3A, shoulder main groove 3B and middle lateral grooves 4A, and a pair of shoulder block rows 7R each of which includes a plurality of shoulder blocks 7 divided among the shoulder main groove 3B, tread edge Te and shoulder lateral grooves 4B.

The tread portion 2 in this embodiment has a point symmetrical pattern with respect to any point on the tire equator C except for a variable pitch arrangement of lateral grooves or the like.

Here, tread edges Te are the axial outermost edges of the ground contacting patch of the tread portion 2 which occurs under a normally inflated loaded condition when the camber angle of the tire is zero. The normally inflated loaded condition is such that the tire is mounted on a standard wheel rim and inflated to a standard pressure and loaded with a standard tire load.

The tread width TW of the tread portion 2 is defined as the width measured under a normally inflated unloaded condition, as the axial distance between the inboard and outboard tread edges Tei, Teo determined as above. The normally inflated unloaded condition is such that the tire is mounted on the standard wheel rim and is inflated to the standard pressure but loaded with no tire load.

In this application including specification and claims, various dimensions, positions and the like of the tire refer to those under the normally inflated unloaded condition of the tire unless otherwise noted.

The standard wheel rim is a wheel rim officially approved or recommended for the tire by standards organizations, i.e. JATMA, TRA, ETRTO, and the like which are effective in the area where the tire is manufactured, sold or used. For example, the standard wheel rim is the "standard rim" specified in JATMA, the "Measuring Rim" in ETRTO, and the "Design Rim" in TRA or the like.

The standard pressure and the standard tire load are the maximum air pressure and the maximum tire load for the tire specified by the same organization in the Air-pressure/Maximum-load Table or similar list. The standard pressure is the "maximum air pressure" in JATMA, the "Inflation Pressure" in ETRTO, and the maximum pressure given in the "Tire Load Limits at Various Cold Inflation Pressures" table in TRA or the like.

The standard tire load is the "maximum load capacity" in JATMA, the "Load Capacity" in ETRTO, and the maximum value given in the above-mentioned table in TRA or the like.

In case of passenger car tires, however, the standard pressure and standard tire load are uniformly defined by 180 kPa and 88% of the maximum tire load, respectively.

Each center main groove 3A extends in a zigzag manner that includes a plurality of inclined long sides 8 (upward to the left in FIG. 1), and a plurality of inclined short sides 9, which are alternately arranged in a circumferential direction of the tire. The center main groove 3A provides high friction force against the road using its axial edge component when braking or accelerating so that icy road performance of the tire may be improved. In this embodiment, the inclined long side 8 includes a main part 8a having substantially constant groove width, and a sub part 8b connected with the main part 8a and having a groove width larger than that of the main part 8a so as to have a L-shaped body having a protrusion protruding to the axially inwardly of the tire.

The center main groove 3A has a groove centerline 10 that comprises a first centerline line element 10a of the inclined long side 8 and a second centerline element 10b of the inclined short side 9. In this embodiment, the first centerline line element 10a has an inclination of upward to the left, and the second centerline element 10b has an inclination of upward to the right, respectively.

Figure 2:
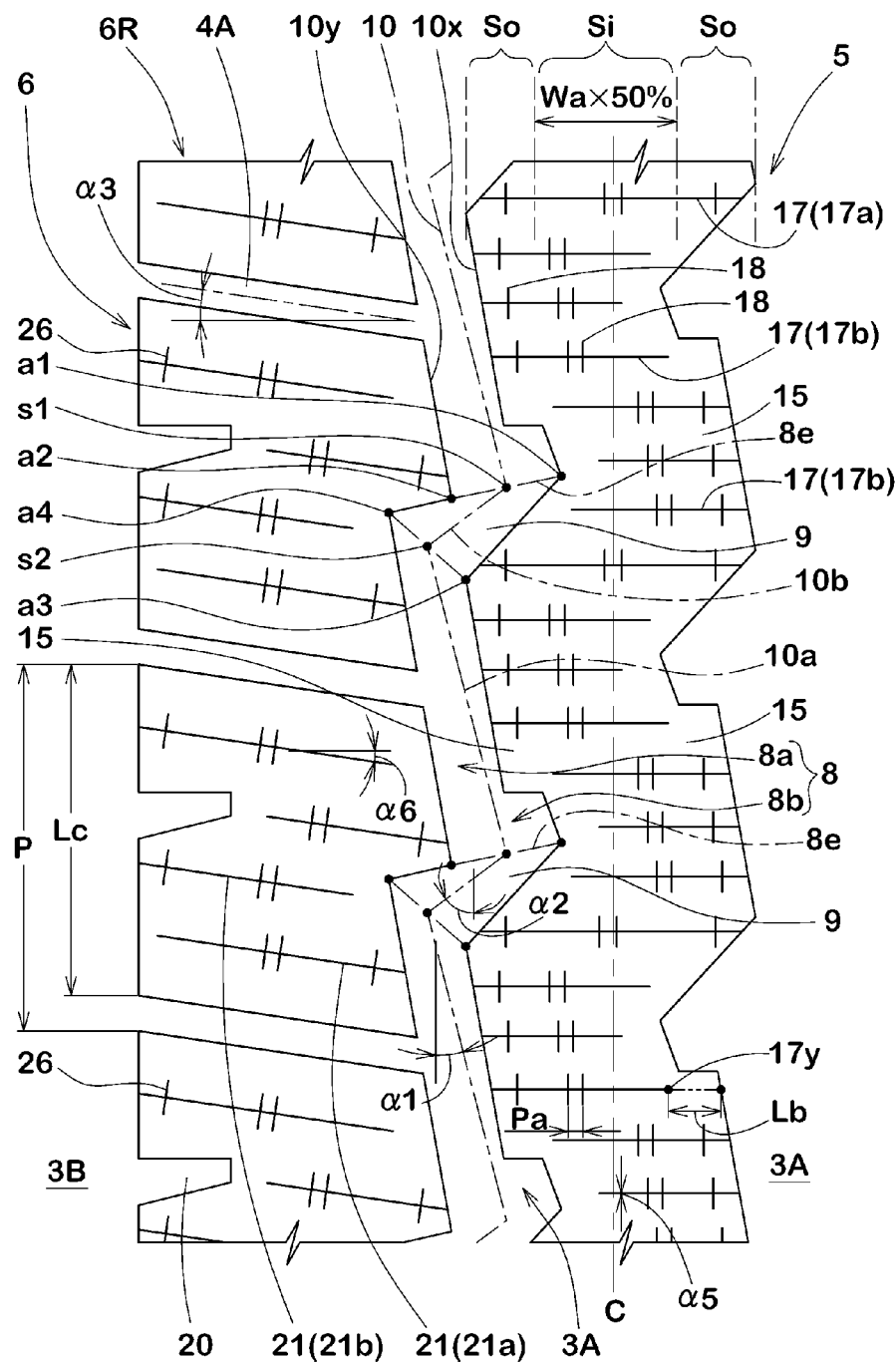
FIG. 2 is a partial enlarged view of FIG. 1 including a center main groove on the left side of a tire equator.

FIG. 2 illustrates a partial enlarged view of the area in the tread portion 2 that includes the center main groove 3A on the left side of the tire equator C of FIG. 1. Referring to FIG. 2, the groove centerline 10 of the center main groove 3A extends so as to alternately pass a first point s1 and a second point s2. In the center main groove 3A, the first point s1 is a center point of the line that connects between the axially innermost point a1 on the axially inner groove edge "10x" and the axially innermost point a2 on the axially outer groove edge 10y. Similarly, the second point s2 is a center point of the line that connects between the axially outermost point a3 on the axially inner groove edge 10x and the axially outermost point a4 on the axially outer groove edge 10y. In FIG. 2, a boundary 8e between the inclined long side 8 and inclined short side 9 is illustrated using two dot lines.

In order to maximize drainage performance of the center main groove 3A and lateral edge effect of the center main groove 3A as mentioned above, the inclined long side 8 preferably has an angle α1 in a range of not less than 5 degrees, more preferably not less than 7 degrees, but preferably not more than 20 degrees, more preferably not more than 18 degrees, with respect to the circumferential direction of the tire. In this specification, an angle of a groove means the angle measured using a groove centerline.

In the same point of view above, the inclined short side 9 preferably has an angle α2 in a range of not less than 30 degrees, more preferably not less than 35 degrees, but preferably not more than 60 degrees, more preferably not more than 55 degrees, with respect to the circumferential direction of the tire.

Referring to FIG. 1, the shoulder main groove 3B straightly extends along the circumferential direction of the tire to smoothly drain the water from under the tread portion 2 backwardly. Furthermore, such a straight groove may improve stability of straight traveling ahead on dry roads by maintaining rigidity of the middle and shoulder blocks 6, 7.

Figure 3:
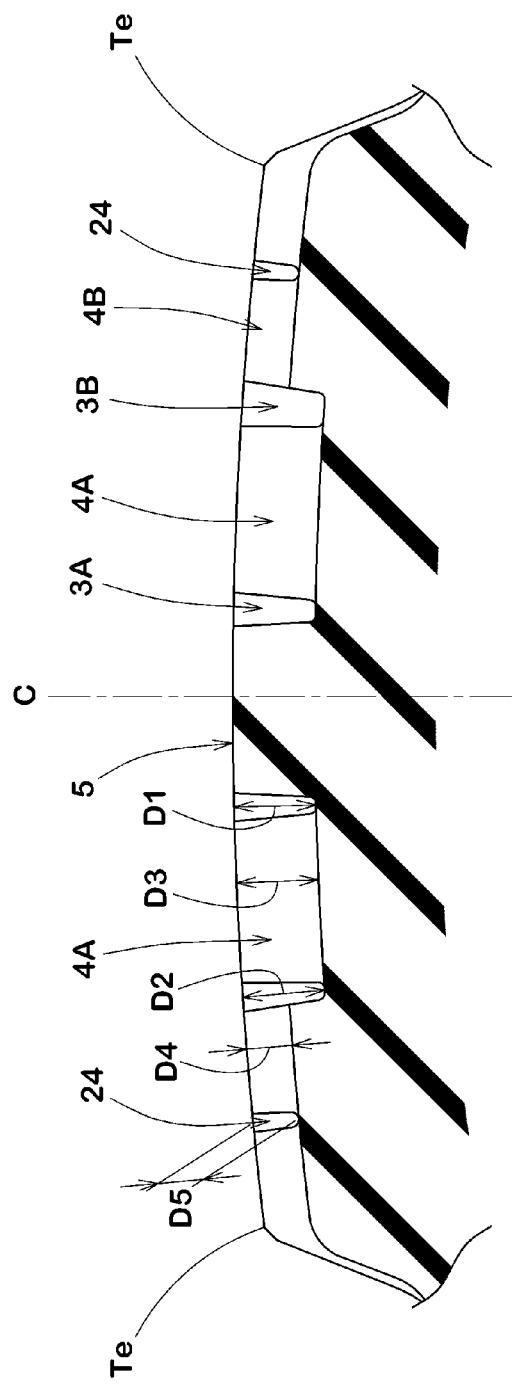
FIG. 3 is a cross sectional view taken along a line x-X in FIG. 1.

Each of the center and shoulder main grooves 3A, 3B has the respective groove width W1, W2 and groove depth D1, D2 (shown in FIG. 3). In order to further improve drainage performance while maintaining steering stability of the tire, each groove width W1, W2 is preferably set in a range of from 2% to 6% in respect to the tread width TW, and each groove depth D1, D2 is preferably set in a range of from 10 to 15 mm.

In this specification, a groove width is defined as a width measured perpendicular to the longitudinal direction of the groove.

Preferably, the location for each of main grooves 3 to 5 is determined taking into lateral rigidity of each land portion 5 to 7 so that steering stability on dry roads may be improved. Preferably, the axial distance L1 between the tire equator C and a position G1 of the center main groove 3A is in a range of from 3% to 11% in respect to the tread width TW. Preferably, the axial distance L2 between the tire equator C and a position G2 of the shoulder main groove 3B is in a range of from 25% to 35% in respect to the tread width TW.

The positions G1, G2 of main grooves 3A, 3B are defined using groove centerlines thereof. However, in case that the groove centerline extends in a zigzag manner like the center main groove 3A, a circumferentially and straightly extending line passing through its center of the zigzag amplitude is regarded as the groove centerline for determine the location of the main groove.

In order to further improve drainage performance and icy road performance, the center main groove 3A preferably has a zigzag amplitude y1 in a range of not less than 10%, more preferably not less than 12%, but preferably not more than 20%, more preferably not more than 18%, in respect to a maximum axial width wa of the center portion 5. The zigzag amplitude y1 of the center main groove 3A is a half of the axial length between two points a1 and a4.

In order to further improve drainage performance, each middle lateral groove 4A straightly extends having an angle α3 with respect to the axial direction of the tire. In this embodiment, each middle lateral groove 4A is inclined in the same direction which is upward to the left. Preferably, the angle α3 of the middle lateral groove 4A is in a range of from 7 to 10 degrees.

The shoulder lateral groove 4B comprises an axially inner portion 13a that straightly extends from the shoulder main groove 3B toward the tread edge Te with an inclination with respect to the axial direction of the tire, and an axially outer portion 13b straightly extending along the axial direction of the tire so as to connect between the inner portion 13a and the tread edge Te. Such a shoulder lateral groove 4B helps to effectively disperse the water from under the shoulder block row 7R, while maintaining rigidity of the shoulder blocks 7 so that steering stability of the tire may be improved.

Preferably, the axially inner portion 13a of the shoulder lateral groove 4B has the angle α4 in a range of not less than 10 degrees, more preferably not less than 12 degrees, but preferably not more than 20 degrees, more preferably not more than 18 degrees, with respect to the axial direction of the tire.

In order to further improve drainage performance while maintaining rigidity of the shoulder block 7, the axially inner portion 13a of the shoulder lateral groove 4B preferably has the groove width W4a in a range of not less than 8%, more preferably not less than 9%, but preferably not more than 18%, more preferably not more than 17%, in respect to the maximum circumferential length La of the shoulder block 7. The axially outer portion 13b of the shoulder lateral groove 4B preferably has the groove width W4b larger than that of the axially inner portion 13a, whereby the water flow from the axially inner portion 13a may be smoothly drained to the tread edge Te. The groove width W4b of the axially outer portion 13b is preferably in a range of from 1.2 times, more preferably not less than 1.3 times, but preferably not more than 2.4 times, more preferably not more than 2.3 times, in respect to the groove width W4a of the axially inner portion 13a of the shoulder lateral groove 13.

FIG. 3 illustrates a cross sectional view of the tire 1 taken along a line X-X in FIG. 1. Referring to FIG. 3, the middle lateral groove 4A preferably has the groove depth D3 in a range of from 8 to 13 mm, in order to improve icy road performance and drainage performance. In the same point of view above, the shoulder lateral groove 4B preferably has the groove depth D4 in a range of from 7 to 12 mm. In this embodiment, the groove depth D4 of the shoulder lateral groove 4B is smaller than the groove depth D3 of the middle lateral groove 4A, as for improving rigidity of the shoulder block 7 that is subjected to large lateral force during cornering.

Referring to FIG. 2, the center portion 5 has an axially protruded part 15 surrounded between the inclined long side 8 and the inclined short side 9 that is adjacent to the main part 8a of the inclined long side 8. The axially protruded part 15 improves icy road performance by offering high friction force against on icy road using its lateral edge component for scratching the road surface. The center portion 5 has a plurality of protruded parts 15 arranged on both sides of the tire equator in a zigzag manner arrangement.

The center portion 5 is further provided with at least six, preferably seven axially extending center sipes 17 within a circumferential region corresponding to the pitch P of circumferentially adjacent middle lateral grooves 4A, 4A in the middle block row 6R. Such high density center sipes 17 further improve icy road performance by offering lateral edge components for scratching the icy road surface. The center sipes 17, however, tend to reduce rigidity of the center portion 5, whereby steering stability of the tire tends to deteriorate. In view of above, the center portion 5 is preferably provided with at most nine, more preferably at most eight center sipes 17 within the circumferential region mentioned above. In this embodiment, seven center sipes 17 are provided within the circumferential region of the center portion 5.

The center sipes 17 include at least one sipe straightly extending along the axial direction of the tire and is connected to one of the center main grooves 3A through the protruded part 15. Such a center sipe 17 further improve icy road performance by offering lateral edge components for scratching the road surface. In another aspect of the present invention, the center sipe 17 may extend in zigzag or wavy manners. The center sipe 17 preferably has the angle α5 in a range of from 0 to 10 degrees with respect to the axial direction of the tire.

The center sipes 17 further include at least one full opened sipe 17a extending between a pair of center main grooves 3A, 3A, and at least one semi-opened sipe 17b extending from the inclined long side 8 of one of the center grooves 3A beyond the tire equator C without reaching the other one of the center main grooves 3A. In order to improve icy road performance and steering stability on dry roads in proper balance, one full opened sipe 17a and six semi-opened sipes 17b are provided in each circumferential region of the center portion 5 that corresponds to the pitch P, for example.

In view of above, the semi-opened sipe 17b preferably has its terminating end 17y away from the nearest center main groove 3A at the axial distance Lb in a range of not less than 8%, more preferably not less than 10%, but preferably not more than 28%, more preferably not more than 26%, in respect to the axial maximum width wa (shown in FIG. 1) of the center portion 5.

The center portion is further provided with a plurality of circumferentially extending short sipes 18 each of which extends so as to cross the center sipe 17 and has a longitudinal length shorter than that of the center sipe 17. Thus, steering stability of the tire may be improved due to longitudinal edges of the short sipes 18. In this embodiment, the center portion 5 includes a center region Si having a 50% width of the axial maximum width wa of the center portion 5, and a pair of side regions "So" on both sides of the center region Si. In the center region Si, two short sipes 18 are provided on each center sipe 17. In each side region "So", one short sipe 18 is provided on each center sipe 17. Since the arrangement of short sipes 18 mentioned above helps to adjust rigidity of the center portion in well balance with respect to the axial direction of the tire, the center block may effectively utilize edges of sipes for scratching the road surface so as to obtain high friction force against icy roads. Therefore, icy road performance of the tire 1 may be further improved. Here, the definition for the center region and the side regions is also employed for the other land portions 6 to 7.

In view of above, the short sipes 18 in the center region Si are preferably separated using the axial pitch Pa in a range of from 4% to 8% in respect to the axial maximum width wa of the center portion 5.

Each middle block 6 has the circumferential length Lc in a range of not less than 85%, more preferably not less than 88% with respect to the pitch P of middle lateral grooves 4A. Thus, the middle block 6 may have high circumferential rigidity for improving traction and braking force on icy roads. In order to maintain drainage performance of the tire, the middle block 6 has the circumferential length Lc in a range of not more than 95%, more preferably not more than 92% with respect to the pitch P.

The middle block 6 is provided with a middle lug groove 20 that extends from the shoulder main groove 3B to its axially inner end terminating within the middle block 6. Thus, traction and braking force generated from the tread portion 2 is further increased due to lateral edge components of the middle lug groove 20.

Referring to FIG. 1, each middle lug groove 20 is arranged so as to be connected with the shoulder lateral groove 4B through the shoulder main groove 3B, so that the water under the middle block row 6R may be smoothly dispersed toward the tread edge Te. Preferably, at the shoulder main groove 3B, the opening of the shoulder lateral groove 4B faces at least partially to the opening of the middle lug groove 20.

Referring to FIG. 2, each middle block 6 is further provided with at least one axially extending middle sipe 21. Furthermore, the number of middle sipes 21 on each middle block 6 is five or less, in order to maintain longitudinal rigidity of the middle block 6 while improving icy road performance by offering lateral edge effect of sipes. In view of above, the number of middle sipes 21 on each middle block 6 is preferably in a range of not less than two, more preferably not less than three, but preferably not more than four. In this embodiment, four middle sipes 21 is provided on each middle block 6.

The middle sipes 21 provided on each middle block 6 include a plurality of first semi-opened sipes 21a extending from the center main groove 3A to axially outer ends terminating within the middle block 6, and a plurality of second semi-opened sipes 21a extending from the shoulder main groove 3B to axially inner ends terminating within the middle block 6. The first and second semi-opened sipes 21a, 21b are alternately arranged in the circumferential direction of the tire for equalizing rigidity of the middle block 6 with respect to the circumferential direction of the tire. Thus, steering stability and icy road performance may be further improved. Furthermore, the middle sipe 20 preferably has the same angle α6 with the middle lateral groove 4A, with respect to the axial direction of the tire.

Referring to FIG. 1, each shoulder block 7 is provided with a circumferentially extending shoulder narrow groove 24. Thus, each shoulder block 7 is divided into the axially inner block piece 7A and the axially outer block piece 7B. The shoulder narrow groove 24 provides a longitudinal edge that increases friction force against the road for improving steering stability.

In view of above, the shoulder narrow groove 24 preferably has the groove width W5 in a range of not less than 0.5 mm, more preferably not less than 0.7 mm, but preferably not more than 1.5 mm, more preferably not more than 1.3 mm. Preferably, the shoulder narrow groove 24 preferably has the groove depth D5 (shown in FIG. 3) in a range of not less than 4 mm, more preferably not less than 5 mm, but preferably not more than 9 mm, more preferably not more than 8 mm.

The axially inner block piece 7A is provided with a plurality of inner shoulder sipes 25a each of which extends from the shoulder narrow groove 24 to its axially inner end terminating within the inner block piece 7A. The axially outer block piece 7B is provided with a plurality of outer shoulder sipes 25b each of which extends from the shoulder narrow groove 24 to its axially outer end terminating within the outer block piece 7B. Thus, icy road performance may be further improved while maintaining rigidity of shoulder blocks 7 that is subjected to large lateral force during cornering.

The axially inner shoulder sipe 25a is preferably inclined at the angle that is same angle α8 of the axially inner part 13a of the shoulder lateral groove 4B for maintaining rigidity of the axially inner block piece 7A. In the same point of view, the axially outer shoulder sipe 25b preferably extends along the axial direction of the tire.

Furthermore, the middle block 6 and the shoulder block 7 are provided with the short Sipes 26 each of which extends so as to cross the middle Sipe 21, axially inner shoulder sipe 25a, or axially outer shoulder sipe 25b. Each short sipe 26 has a longitudinal length shorter than the respective middle sipe 21, axially inner shoulder sipe 25a, and axially outer shoulder sipe 25b. In the center region of the middle block 6 and the shoulder block 7, two short sipes 18 are provided on each sipe 26, 25a and 25b. In each side region of the middle block 6 and the shoulder block 7, one short sipe 18 is provided on each sipe 26, 25a and 25b.

Figure 4:
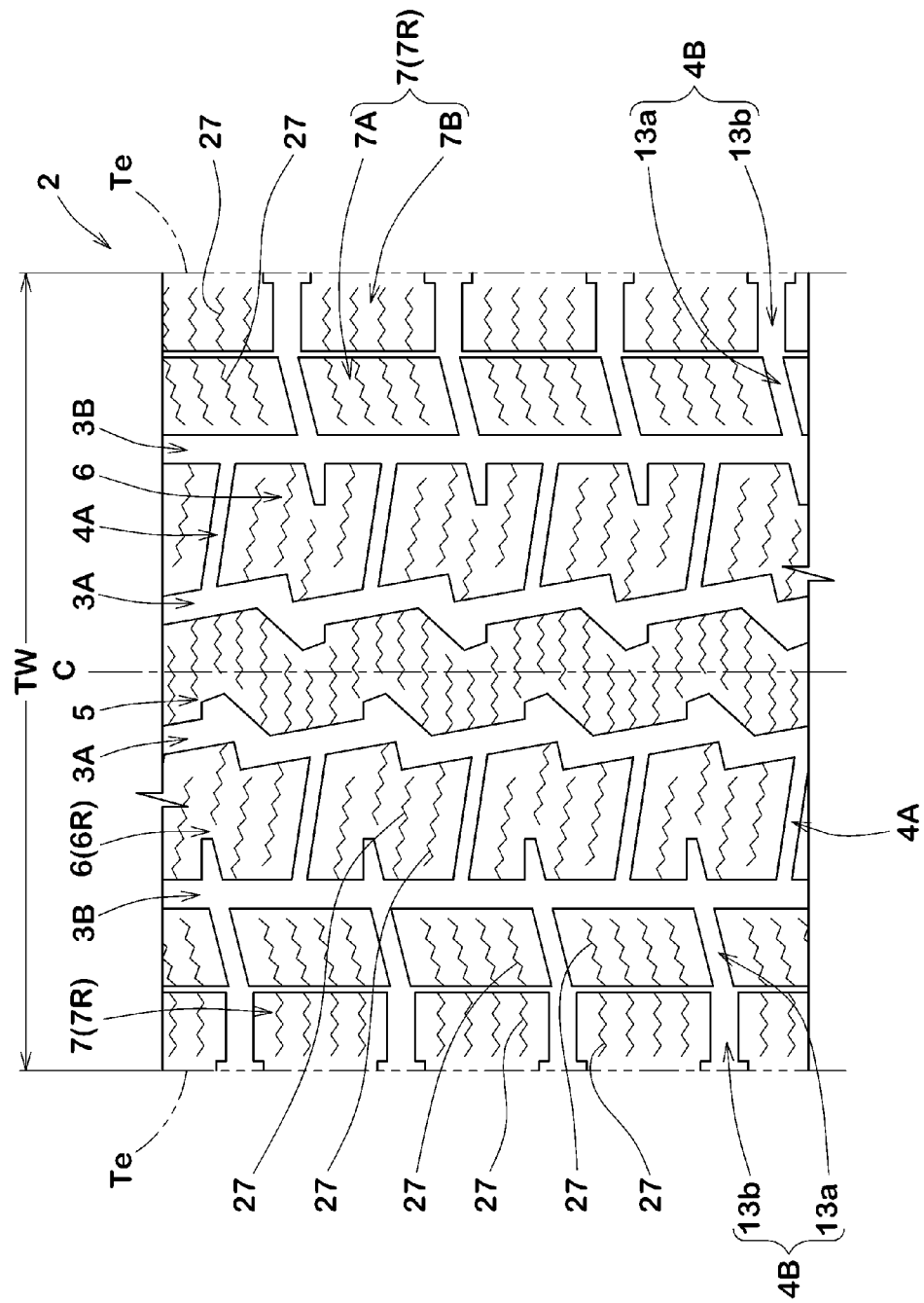
FIG. 4 is a development view of a tread portion of a pneumatic tire according to another embodiment of the present invention.

FIG. 4 illustrates a development view of the tread portion 2 of the tire 1 according to another embodiment of the present invention. As shown in FIG. 4, at least one axially extending zigzag sipe 27 is arranged on the center portion 5, middle portions 6 and the shoulder blocks 7, respectively. Since the zigzag sipe 27 has multi-directional edges that effectively bite road surfaces, traveling performance of the tire on snowy and icy roads may further be improved.

The present invention is more specifically described and explained by means of the following Examples and References. It is to be understood that the present invention is not limited to these Examples and embodiments described above.

Comparison Test

Pneumatic tires having a tire size of 195/80R15 with basic tread patterns of FIG. 1 except for details shown in Table 1 were made and tested with respect to steering stability on a dry road, drainage performance, and icy road performance. Furthermore, pneumatic tires having a tire size of 195/80R15 with basic tread patterns of FIG. 4 except for details shown in Table 2 were made and tested with respect to steering stability on a dry road, drainage performance, and icy road performance, in the similar way. Major common specifics of tires and test method are as follows.

Details of Test Tires:
Tread width TW: 162 mm
Groove Depths
Each main groove D1, D2: 12.5 mm
Middle lateral groove D3: 9.0 mm
Middle lug groove: 9.0 mm
Shoulder lateral groove D4: 7.0 mm
Shoulder narrow groove D5: 10.5 mm
Center Sipe
Number of center sipes within each pitch of middle lateral grooves: Shown in Tables 1 and 2
Number of full opened center sipes included in each pitch: 1
Distance Lb/Tw: 16% to 20%
Others
Sipe depth except for short sipe: 8.0 mm
Short sipe depth: 4.0 mm
Rim size: 15×6.07
Internal pressure: 350 kPa (Front), 425 kPa (Rear)
Tire load: 4.9 kN Steering Stability on Dry Road Test:

A four wheel drive car with a displacement of 2,700 cc provided with test tires as four wheels was driven by a professional test driver on a test course having a dry asphalt road, and evaluated steering stability such as the steering response, stiffness and grip according to his feeling. The results are shown with a score of 100 representing a value in Ex.1. The larger the value, the better the performance is.

Drainage Performance Test:

The test car was entered into a course with a water puddle 10 mm deep and 5 m width, on an asphalt road surface with a radius of 102 m, with stepwise speed increase. Then, lateral acceleration (lateral G) of the vehicle was measured, and average lateral G of the front wheels at speeds of 60 to 90 km/h was calculated. Calculation results are shown with an index of 100 representing a value in Ex.1. The larger the value, the better the performance is.

Icy Road Performance Test:

The test car above with ABS was driven on an icy road, and measured the braking distance from the traveling speed of 30 km/hr. Further, the reciprocal number of the braking distance of each tires were calculated. The results are shown with an index of 100 representing a value in Ex.1. The larger the value, the better the performance is.

Test results are shown in Tables 1 and 2

TABLE 1

| | Ex. 1 | Ref. 1 | Ex. 2 | Ex. 3 | Ex. 4 | Ex. 5 | Ex. 6 | Ex. 7 | Ref. 2 | Ex. 8 |
|---|---|---|---|---|---|---|---|---|---|---|
| Number of center sipes within pitch | 7 | 5 | 6 | 9 | 10 | 7 | 7 | 7 | 7 | 7 |
| Number of middle sipes on middle block | 4 | 4 | 4 | 4 | 4 | 1 | 2 | 5 | 6 | 4 |
| Ratio Lc/P (%) | 90 | 90 | 90 | 90 | 90 | 90 | 90 | 90 | 90 | 90 |

TABLE 1-continued

|  |  |  |  |  |  |  |  |  |  |  |
|---|---|---|---|---|---|---|---|---|---|---|
| Protruded part | Presence | Presence | Presence | Presence | Presence | Presence | Presence | Presence | Presence | Absence |
| Middle sipe configuration | Semi-opened | Semi-opened | Semi-opened | Semi-opened | Semi-opened | Semi-opened | Semi-opened | Semi-opened | Semi-opened | Semi-opened |
| Number of short sipe(s) in center region of center portion | 2 | 2 | 2 | 2 | 2 | 2 | 2 | 2 | 2 | 2 |
| Number of short sipe(s) in side region of center portion | 1 | 1 | 1 | 1 | 1 | 1 | 1 | 1 | 1 | 1 |
| Steering stability on dry road [Score] | 100 | 102 | 101 | 98 | 96 | 102 | 101 | 98 | 95 | 102 |
| Drainage performance [Index] | 100 | 100 | 100 | 100 | 100 | 100 | 100 | 100 | 100 | 100 |
| Icy road performance [Index] | 100 | 95 | 98 | 101 | 102 | 96 | 97 | 101 | 102 | 96 |

|  | Ref. 3 | Ex. 9 | Ex. 10 | Ref. 4 | Ex. 11 | Ex. 12 | Ex. 13 | Ex. 14 | Ex. 15 | Ex. 16 |
|---|---|---|---|---|---|---|---|---|---|---|
| Number of center sipes within pitch | 7 | 7 | 7 | 7 | 7 | 7 | 7 | 7 | 7 | 7 |
| Number of middle sipes on middle block | 4 | 4 | 4 | 4 | 4 | 4 | 4 | 4 | 4 | 4 |
| Ratio Lc/P (%) | 80 | 85 | 95 | 98 | 90 | 90 | 90 | 90 | 90 | 90 |
| Protruded part | Presence | Presence | Presence | Presence | Presence | Presence | Presence | Presence | Presence | Presence |
| Middle sipe configuration | Semi-opened | Semi-opened | Semi-opened | Semi-opened | Full-opened | Semi-opened | Semi-opened | Semi-opened | Semi-opened | Semi-opened |
| Number of short sipe(s) in center region of center portion | 2 | 2 | 2 | 2 | 0 | 0 | 1 | 3 | 2 | 2 |
| Number of short sipe(s) in side region of center portion | 1 | 1 | 1 | 1 | 1 | 1 | 1 | 1 | 0 | 2 |
| Steering stability on dry road [Score] | 95 | 98 | 101 | 102 | 99 | 100 | 100 | 99 | 100 | 99 |
| Drainage performance [Index] | 102 | 101 | 98 | 95 | 100 | 100 | 100 | 100 | 100 | 100 |
| Icy road performance [Index] | 100 | 100 | 100 | 100 | 99 | 98 | 99 | 100 | 99 | 100 |

TABLE 2

|  | Ex. 1R | Ref. 1R | Ex. 2R | Ex. 3R | Ex. 4R | Ex. 5R | Ex. 6R | Ex. 7R | Ref. 2R | Ex. 8R |
|---|---|---|---|---|---|---|---|---|---|---|
| Number of center sipes within pitch | 7 | 5 | 6 | 9 | 10 | 7 | 7 | 7 | 7 | 7 |
| Number of middle sipes on middle block | 4 | 4 | 4 | 4 | 4 | 1 | 2 | 5 | 6 | 4 |
| Ratio Lc/P (%) | 90 | 90 | 90 | 90 | 90 | 90 | 90 | 90 | 90 | 90 |
| Protruded part | Presence | Presence | Presence | Presence | Presence | Presence | Presence | Presence | Presence | Absence |
| Middle Sipe configuration | Semi-opened | Semi-opened | Semi-opened | Semi-opened | Semi-opened | Semi-opened | Semi-opened | Semi-opened | Semi-opened | Semi-opened |
| Number of short sipe(s) in center region of center portion | 2 | 2 | 2 | 2 | 2 | 2 | 2 | 2 | 2 | 2 |
| Number of short sipe(s) in side region of center portion | 1 | 1 | 1 | 1 | 1 | 1 | 1 | 1 | 1 | 1 |
| Steering stability on dry road [Score] | 100 | 102 | 101 | 98 | 96 | 103 | 102 | 97 | 95 | 103 |
| Drainage performance [Index] | 100 | 100 | 100 | 100 | 100 | 100 | 100 | 100 | 100 | 100 |
| Icy road performance [Index] | 100 | 94 | 99 | 102 | 103 | 97 | 98 | 102 | 101 | 97 |

|  | Ref. 3R | Ex. 9R | Ex. 10R | Ref. 4R | Ex. 11R | Ex. 12R | Ex. 13R | Ex. 14R | Ex. 15R | Ex. 16R |
|---|---|---|---|---|---|---|---|---|---|---|
| Number of center sipes within pitch | 7 | 7 | 7 | 7 | 7 | 7 | 7 | 7 | 7 | 7 |
| Number of middle sipes on middle block | 4 | 4 | 4 | 4 | 4 | 4 | 4 | 4 | 4 | 4 |
| Ratio Lc/P (%) | 80 | 85 | 95 | 98 | 90 | 90 | 90 | 90 | 90 | 90 |
| Protruded part | Presence | Presence | Presence | Presence | Presence | Presence | Presence | Presence | Presence | Presence |
| Middle sipe configuration | Semi-opened | Semi-opened | Semi-opened | Semi-opened | Full-opened | Semi-opened | Semi-opened | Semi-opened | Semi-opened | Semi-opened |
| Number of short sipe(s) in center region of center portion | 2 | 2 | 2 | 2 | 0 | 0 | 1 | 3 | 2 | 2 |
| Number of short sipe(s) in side region of center portion | 1 | 1 | 1 | 1 | 1 | 1 | 1 | 1 | 0 | 2 |
| Steering stability on dry road [Score] | 94 | 98 | 102 | 103 | 98 | 100 | 100 | 99 | 100 | 99 |
| Drainage performance [Index] | 103 | 102 | 99 | 95 | 100 | 100 | 100 | 100 | 100 | 100 |
| Icy road performance [Index] | 100 | 100 | 100 | 100 | 99 | 97 | 98 | 100 | 98 | 100 |

From the test results of Tables 1 and 2, it was confirmed that Example tires in accordance with the present invention can be effectively improved steering stability, icy road performance, and drainage performance, as compared with the reference tires.

What is claimed is:

1. A pneumatic tire comprising:
   a tread portion provided with a pair of circumferentially and continuously extending center main grooves on both sides of a tire equator to define a center portion therebetween, a pair of circumferentially and continuously extending shoulder main grooves arranged axially outside the center main grooves to define a middle portion between the center main groove and the shoulder main groove on each side of the tire equator, and a plurality of middle lateral grooves to divide the middle portion into a middle block row including a plurality of middle blocks;
   each center main groove extending in a zigzag manner including a plurality of inclined long sides and a plurality of inclined short sides, which are alternately arranged in a circumferential direction of the tire;
   each of the inclined long sides comprising a main part having a substantially constant groove width and a sub part having a groove width larger than that of the main part so as to form an L-shape to protrude axially inward of the tire, each of the inclined long sides and the inclined short sides defined by a first boundary and a second boundary, wherein the first boundary is a line that connects between an axially innermost point (a1) of an axially inner groove edge (10x) of the center main groove and an axially innermost point (a2) of an axially outer groove edge (10y) of the center main groove, and wherein the second boundary is a line that connects between an axially outermost point (a3) of the axially inner groove edge (10x) of the center main groove and an axially outermost point (a4) of the axially outer groove edge (10y) of the center main groove;

the center portion being provided with at least six axially extending center sipes within a circumferential region corresponding to a pitch of circumferentially adjacent middle lateral grooves; and each middle block having a circumferential length in a range of from 85% to 95% with respect to the pitch, and being provided with at least one axially extending middle sipe, wherein the number of middle sipe on each middle block is five or less.

2. The tire according to claim 1, wherein the center portion has an axially protruded part surrounded between the inclined long side and inclined short side of the center main groove.

3. The tire according to claim 2, wherein the center sipes include a sipe communicated with the protruded part.

4. The tire according to claim 1, wherein the middle sipes comprise a plurality of first middle sipes extending from the center main groove and terminating within the middle portion, and a plurality of second middle sipes extending from the shoulder main groove and terminating within the middle portion, wherein the first middle sipes and second middle sipes are alternately arranged in the circumferential direction of the tire.

5. The tire according to claim 1, wherein each of the inclined short sides is formed as a triangular shape.

6. The tire according to claim 1, wherein each of the middle lateral grooves is inclined at the same inclination as an inclination of each inclined long side.

7. The tire according to claim 6, wherein each of the middle lateral grooves is connected to a middle portion of each inclined long side.

8. The tire according to claim 1, wherein the main part of each inclined long side extends in a straight shape.

9. The tire according to claim 1, wherein one of the middle blocks is provided with a middle lug groove extending from one of the shoulder main grooves and terminating within the middle block, and the middle lug groove is inclined in an opposite direction to an inclination of the middle lateral grooves.

* * * * *